United States Patent [19]
Eastman

[11] 3,849,020
[45] Nov. 19, 1974

[54] FLUIDIC COMPRESSOR AIR BLEED VALVE CONTROL APPARATUS
[75] Inventor: James M. Eastman, South Bend, Ind.
[73] Assignee: The Bendix Corporation, South Bend, Ind.
[22] Filed: Sept. 13, 1973
[21] Appl. No.: 396,905

[52] U.S. Cl. .............................. 415/28, 60/39.27
[51] Int. Cl. .......................................... F01b 25/00
[58] Field of Search ............... 415/28, 30; 60/39.27

[56] References Cited
UNITED STATES PATENTS

| | | | |
|---|---|---|---|
| 2,950,596 | 8/1960 | Haase et al. | 60/39.28 |
| 2,978,166 | 4/1961 | Hahn | 415/28 |
| 3,327,932 | 6/1967 | Brodell | 415/28 |
| 3,487,993 | 1/1970 | Rannenberg | 415/28 |
| 3,488,948 | 1/1970 | Cornett et al. | 415/28 |
| 3,809,490 | 5/1974 | Harner | 415/28 |

Primary Examiner—C. J. Husar
Attorney, Agent, or Firm—Gordon H. Chenez; William N. Antonis

[57] ABSTRACT

Gas turbine engine compressor air bleed valve control apparatus includes a flow circuit having two series flow restrictions through which a small flow of compressor pressurized air is vented from the compressor air bleed location to the compressor air inlet and between which restrictions a reference air pressure is generated. During an engine acceleration compressor discharge air pressure is compared to the reference air pressure and, upon reaching a predetermined ratio of the same corresponding to a selected engine speed, the bleed valve is actuated in a closing direction to maintain the predetermined ratio constant as engine acceleration continues until a second engine speed is attained at which the bleed valve is closed. The engine speed at which the bleed valve actuation is initiated and the range of engine speeds required to fully close the bleed valve may be varied to suit requirements of a given engine.

10 Claims, 3 Drawing Figures

PATENTED NOV 19 1974    3,849,020

FLUIDIC COMPRESSOR AIR BLEED VALVE CONTROL APPARATUS

BACKGROUND OF THE INVENTION

The present invention is an improvement over the compressor bleed valve actuator shown and described in U.S. Application Ser. No. 347,251 filed Apr. 2, 1973 (common assignee). In particular, the present invention is less complex structurally, less expensive to manufacture, lighter in weight and smaller in volume than that of said Application Ser. No. 347,251.

It will be recognized that the conventional multi-stage axial flow air compressor for a gas turbine engine is provided with matched stages for optimum performance at the design engine speed and compressor pressure ratio. Obviously, at lower engine operating speeds and for engine accelerations and decelerations, the compressor must function at substantially lower compression ratios as a result of which the air density in the rear stages of the compressor is not increased over the air densities in the front stages of the compressor by as high a ratio as exists at design speed. Thus, the volumetric flow rates in the rear stages become a larger fraction of those in the front stages as engine speed decreases which, in turn, results in a corresponding "unloading" of the rear stages and a "loading up" of the front stages resulting in a shifting of the compression ratio burden to the front stages tending to drive the same into the well known compressor phenomenon known as stall.

Various control devices are known which are used to avoid the above-mentioned undesirable tendency of the compressor to "load up." In general, conventional control devices may be classified as (1) variable inlet guide vanes which selectively change compressor stage geometry as a function of engine speed, and (2) compressor bleed valves which are opened to vent pressurized air from an associated compressor front or intermediate stage to a relatively lower pressure air source to thereby unload the stages upstream of the bleed valves.

In comparison to variable inlet guide vanes, the compressor bleed valve is less efficient but has the advantages of reliability, simplicity and lower cost. However, the reduced efficiency of the bleed valve may be tolerated providing air bleeding is not required at normal operating engine speeds for extended periods of operation and/or does not adversely sacrifice acceleration torque.

Prior art compressor bleed valve control apparatus of which I am aware include U.S. Pat. No. 3,172,259, issued Mar. 9, 1965 to Howard L. North, Jr., and U.S. Pat. No. 3,646,753, issued Mar. 7, 1972 to Michael E. Coleman et al. which are not entirely satisfactory for various reasons, including structural complexity, weight and/or bulky nature as well as two position operation wherein the bleed valve is snapped open or closed which has an undesirable effect in that it tends to cause a thrust or power discontinuity in engine operation and/or operation over a more narrowly adjustable range of engine corrected speed.

It has been found that thrust continuity and speed holding stability may be maintained with minimum efficiency penalty by controlling the bleed valve such that it is progressively opened or closed, depending upon engine deceleration or acceleration, over a suitable range of compressor or engine corrected speed ($N/\sqrt{\theta}$) wherein N is rotational speed of the compressor and $\theta$ is compressor inlet air temperature divided by standard atmospheric air temperature (519° R). Since the compression ratio of the compressor is a known function of corrected engine speed, the compression ratio may be utilized to advantage as a substitute of corrected engine speed for control purposes.

SUMMARY OF THE INVENTION

It is an object of the present invention to provide gas turbine engine multiple stage air compressor bleed valve control apparatus which is simple in structure, reliable in operation and relatively inexpensive to manufacture.

It is another object of the present invention to provide gas turbine engine multiple stage air compressor bleed valve control apparatus which opens or closes the bleed valve in proportion to corrected engine speed over a predetermined range of engine speeds.

It is an important object of the present invention to provide gas turbine engine multiple stage axial flow air compressor control apparatus which is primarily fluidic in operation and responsive to compressor compression ratio as defined by compressor inlet and outlet pressures.

Other objects and advantages of the present invention will be apparent from the following description taken with the accompanying drawings.

DESCRIPTION OF THE PREFERRED EMBODIMENT

Figure 1:
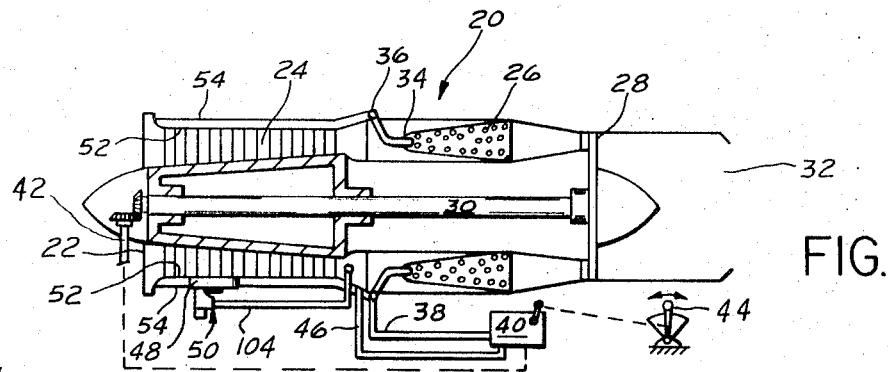
FIG. 1 is a schematic representation of a conventional gas turbine engine and a compressor bleed valve system therefor embodying the present invention.

Referring to FIG. 1, in particular, numeral 20 designates a conventional gas turbine engine provided with an air inlet 22 upstream from a multiple stage axial flow air compressor 24 which discharges pressurized air flow to one or more combustion chambers 26. Hot motive gas generated in the combustion chambers 26 and discharged therefrom is passed through a gas turbine 28 connected to drive the air compressor 24 via a shaft 30. The discharge gas from the gas turbine 28 is expelled through a discharge nozzle 32 thereby providing a propelling thrust.

A controlled rate of fuel flow is supplied to combustion chambers 26 via fuel injection nozzles 34 supplied pressurized fuel by a fuel manifold 36 connected thereto and provided with a fuel supply conduit 38 leading from the outlet of a fuel control generally indicated by 40. The fuel control 40 is adapted to receive control input signals including engine rotational speed N, via suitable gear and shafting 42, power request via a throttle lever 44 and compressor pressurized air at pressure $P_C$ via a conduit 46 providing fluid communication between control 40 and the discharge section of compressor 24.

One or more conventional compressor air bleed valves 48 suitably connected to a selected stage or stages of the compressor 24 and adapted to vent compressor pressurized air therefrom to a suitable relatively low pressure drain source such as the compressor inlet 22 is actuated by control means generally indicated by 50.

Figure 2:
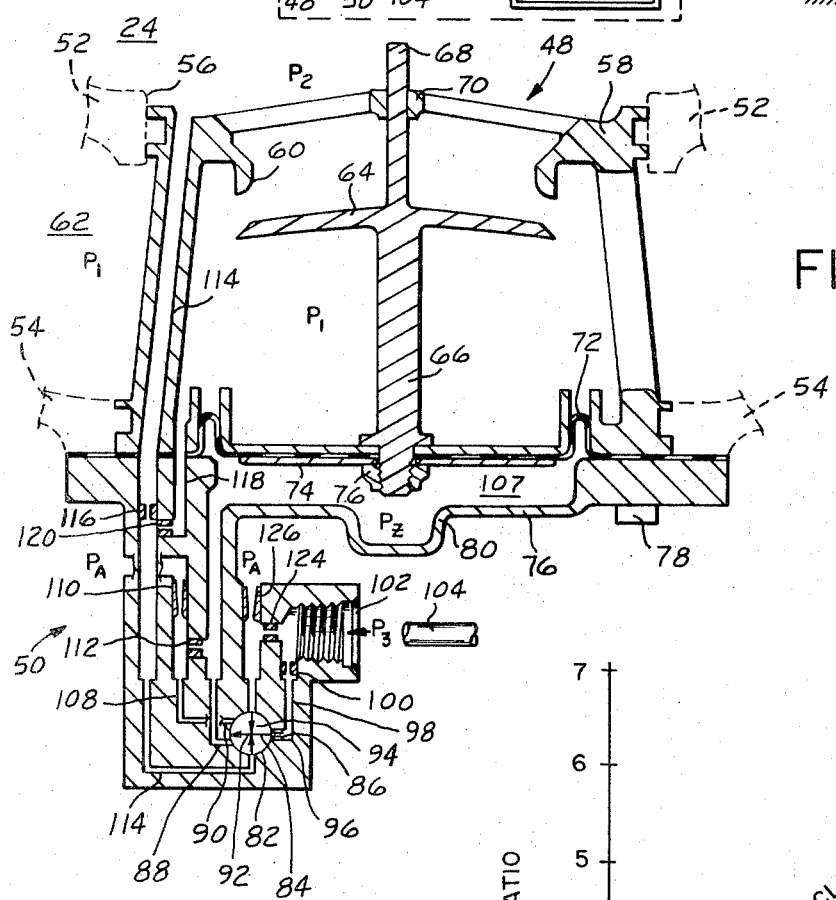
FIG. 2 is a schematic representation of the present invention shown removed from the engine of FIG. 1.

Referring to FIG. 2, in particular, there is shown sections of inner and outer spaced apart casing portions 52 and 54, respectively, of engine 20 which surround compressor 24. The inner casing portion 52 is immediately adjacent the compressor rotor, not shown, and provided with an opening 56 adapted to receive a bleed valve retaining member 58 which is provided with a valve seat 60 through which compressor pressurized air at pressure $P_2$ is vented to an annular duct 62 between casing portions 52 and 54. The annular duct 62 is vented to the compressor inlet 22 and is maintained at relatively low inlet air pressure $P_1$. A poppet valve 64 is provided with oppositely extending stems 66 and 68 and is adapted to seat against valve seat 60 to thereby control the flow of pressurized air through seat 60. The stem 68 is slidably supported in a support or guide bracket 70 integral with retaining member 58. The poppet valve 64 is actuated by a diaphragm 72 fixedly secured to stem 66 by a backing plate 74 against which a nut 76 threadedly engaged with stem 66 bears. The radially outermost portion of diaphragm 72 is clamped between retaining member 58 and a cap 76 which cap 76 is fixedly secured in position by a plurality of bolts 78 extending therethrough into threaded engagement with retaining member 58.

The cap 76 is defined by a casing 80 housing a conventional pure fluid amplifier 82 of the proportionally acting type wherein a power fluid jet 84 discharged from an inlet port 86 toward a pair of outlet ports 88 and 90 passes between opposed control ports 92 and 94 which are supplied pressurized fluid as will be described to deflect the power jet 84 relative to outlet ports 88 and 90 thereby increasing the flow to and thus pressurization of one outlet port and decreasing the flow to and thus pressurization of the other outlet port in proportion to the control pressure differential generated at control ports 92 and 94. In the absence of a pressure differential at control ports 92 and 94 the power jet 84 will occupy a null position thereby pressurizing outlet ports 88 and 90 accordingly. Reference is made to U.S. Pat. No. 3,486,520 issued Dec. 30, 1969 in the name of J. M. Hyer et al. for a proportional type fluid amplifier suitable for use as amplifier 82.

The inlet port 86 is provided with a restriction 96 which is supplied pressurized air at compressor discharge pressure $P_3$ via a passage 98 containing a fixed restriction 100 and leading to a port 102 which, in turn, is connected to a passage 104 loading to the discharge portion of compressor 24. The outlet port 88 is connected via a passage 106 to a chamber 107 partially defined by diaphragm 72. The outlet port 90 is connected via a passage 108 containing a venturi type flow restriction 110 to ambient or atmospheric air pressure $P_4$. A fixed restriction 112 provides fluid communication between passages 106 and 108. The control port 92 is connected via a passage 114 containing a fixed restriction 116 to compressor pressurized air at pressure $P_2$ at the upstream side of poppet valve 64. The passage 114 on the downstream side of restriction 116 is vented to compressor inlet air pressure $P_1$ via a passage 118 containing a fixed restriction 120. A passage 122 containing a fixed restriction 124 and a venturi type restriction 126 connects port 102 with ambient or atmospheric air pressure $P_4$. The control port 94 is connected via a passage 127 to passage 122 intermediate restrictions 124 and 126.

Figure 3:
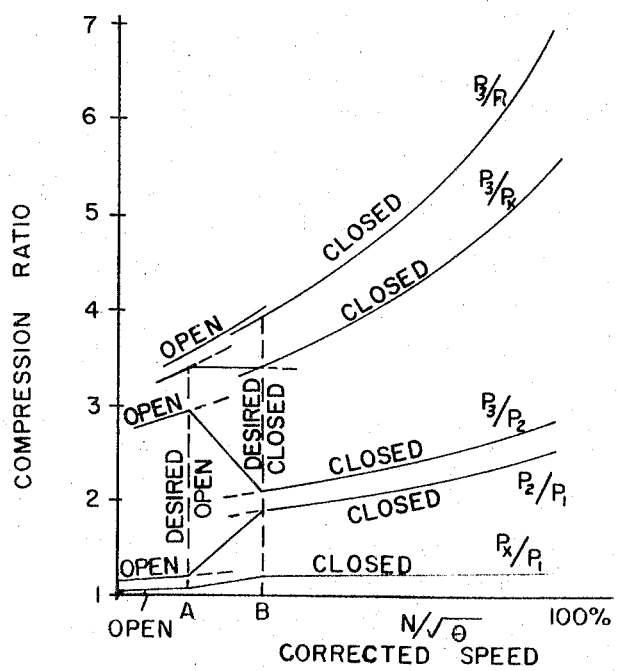
FIG. 3 represents a series of curves or plots of air compression ratio versus corrected engine speed ($N/\sqrt{\theta}$).

Referring to FIG. 3, first and second sources of curves are plotted for various pressure ratios $P_{3/P_1}$, $P_{3/P_x}$, $P_{3/P_2}$, $P_{2/P_1}$, and $P_{x/P_1}$ wherein $P_3$ designates compressor discharge pressure, $P_1$ designates compressor inlet air pressure, $P_2$ designates compressor pressurized air at a given compressor stage where the bleed or poppet valve 64 is located, and $P_x$ designates the air pressure generated intermediate the fixed restrictions 116 and 120. The curve labeled $P_{3/P_1}$ represents the over-all compression ratio of compressor 24; curve labeled $P_{3/P_2}$ represents the compression ratio for the compressor stages aft of the bleed valve 64; curve labeled $P_{2/P_1}$ represents the compression ratio for the compressor stages forward of the bleed valve 64 and curve $P_{x/P_1}$ illustrates the relationship of the ratio of pressures $P_x$ and $P_1$ to the other pressure ratio curves. The "open" series of curves terminate at a first predetermined corrected engine speed, A, and the "closed" series of curves start at a second predetermined higher corrected engine speed, B. Intermediate the first and second predetermined engine speeds the bleed or poppet valve 64 is caused to close in proportion to increasing engine speed from A to B.

It will be noted from the $P_{2/P_1}$ and $P_{3/P_2}$ curves that the gain in compression ratio for the forward stages corresponds closely to the loss in compression ratio for the aft stages of the compressor 24 following the closing of bleed or poppet valve 64.

It will be assumed that the engine 20 is undergoing an acceleration through the speed range from below A to above B. Compressor discharge air at pressure $P_2$ is passed through fixed restrictions 116 and 120 to relatively lower pressure compressor inlet air $P_1$ thereby generating an intermediate pressure $P_x$ which varies in accordance with the relationship $P_x \propto f(P_2/P_1) P_1$ wherein the function $f$ is determined by the area ratio of fixed restrictions 116 and 120 as will be recognized by those persons skilled in the appropriate art. Reference is made to U.S. Pat. No. 2,950,596 issued Aug. 30, 1960 to E. A. Haase et al. for details of flow through two fixed restrictions in series flow relationship. Referring to FIG. 3, the curve labeled $P_{x/P_1}$ illustrates the manner in which pressure $P_x$ varies in response to the increasing engine speed.

The compressor discharge air at pressure $P_3$ is passed through fixed restrictions 124 and venturi 126 to ambient or atmospheric air pressure $P_4$ thereby generating an intermediate pressure $P_y$ which, with sonic flow through venturi 126, is a fixed percentage of pressure $P_3$ as is well known in the art. The pressure $P_x$ is applied to control port 92 where it acts against power jet 84 in opposition to the lesser pressure $P_y$ applied to control port 94 thereby deflecting the power jet 84 toward control port 94 which results in the major portion of the power jet 84 passing through outlet port 90 and venturi 110 to atmospheric air pressure $P_4$. The output pressure $P_z$ at outlet port 88 is decreased accordingly and passes to chamber 107 where it acts against diaphragm 72 in opposition to compressor inlet air pressure $P_1$. The force derived from the pressure differential $P_z - P_1$ acting across diaphragm 72 is overcome by the force derived from the pressure differential $P_2 - P_1$ acting across bleed or poppet valve 64 which urges poppet valve 64 to an open position thereby venting compressor pressurized air at pressure $P_2$ to compressor inlet air pressure $P_1$. It will be recognized that poppet valve 64 will be balanced by $P_Z - P_1$ in accordance with the relationship $P_Z - P_1 = Av/A_D (P_2 - P_1)$ wherein Av designates the effective area of valve 64 and $A_D$ designates the effective area of diaphragm 72.

The pressure $P_Y$ and $P_x$ increase and become equalized at predetermined engine speed A whereupon power jet 84 is caused to assume its null position which results in an increase in outlet pressure $P_Z$ and thus $P_Z - P_1$ pressure differential across diaphragm 72 thereby establishing a force balance on poppet valve 64. As engine acceleration progresses beyond engine speed A, the pressure $P_Y$ increases at a greater rate than pressure $P_x$ thereby deflecting power jet 84 from its null position toward control port 92, resulting in an increase in outlet pressure $P_Z$ which, in turn, results in a force unbalance on poppet valve 64 tending to close the same. As poppet valve 64 moves in a closing direction, the pressure $P_2$ is increased accordingly tending to reestablish a force balance on poppet valve 64. In this manner, poppet valve 64 is caused to close progressively in response to increasing engine speed as the engine accelerates from engine speed A to B. Upon reaching engine speed B, the poppet valve 64 is fully closed thereby blocking air flow through the seat. It will be noted that the ratio of Pressures $P_{3/P_x}$ is controlled to a constant value from engine speed A to B by virtue of the closing of poppet valve 64 and resulting effect on pressure $P_2$. As a result, a substantially linear relationship will exist between the position of poppet valve 64 and corrected engine speed $N/\sqrt{\theta}$ over the speed range defined by A and B.

With poppet valve 64 closed, no further control over pressure $P_2$ can be exercised and the pressure ratio $P_{3/P_x}$ increases with increasing speed, as shown in FIG. 3, with the result that pressure $P_Y$ exceeds pressure $P_x$ to the extent that power jet 84 is maintained in an off-null position tending to increase pressure $P_Z$ to a maximum. Thus, the force tending to hold poppet valve 64 closed is maintained in excess of the opposing force derived from $P_Z - P_1$, as the engine accelerates from engine speed B to the selected speed.

In the case of reverse operation, i.e., an engine deceleration, it will be recognized that the poppet valve 64 will be caused to open progressively from B to A. Upon reaching engine speed A, the force unbalance imposed on poppet valve 64 will increase to maintain poppet valve 64 in the maximum open position at engine speeds below point A.

It will be understood that the spread between engine speeds A and B may be adjusted to suit the characteristic of a given engine. To that end, the fixed restriction 116 may be plugged thereby making $P_x$ equal to pressure $P_1$ in which case the poppet valve 64 will tend to operate at a fixed $P_{3/P_1}$ pressure ratio resulting in little or no engine speed spread between open and closed positions of poppet valve 64. However, if fixed restriction 120 is plugged thereby making pressure $P_x$ equal to pressure $P_2$, the poppet valve 64 will operate at a fixed $P_{3/P_2}$ ratio resulting in a relatively large engine speed spread between open and closed positions of poppet valve 64. Obviously, the ratio of areas of fixed restrictions 116 and 120 may be selected to generate a pressure $P_x$ which is closer to pressure $P_1$ or $P_2$ thereby increasing or decreasing, respectively, the range of engine speeds between points A and B.

It will be noted that the area ratio of fixed restriction 124 and venturi 126 also has an effect on the operation of poppet valve 64. For example, the ratio of fixed restriction 124 to venturi 126 may be increased thereby reducing the ratio of pressure $P_3$ to pressure $P_y$. This results in a lower ratio of pressures $P_{3/P_x}$ regulated by poppet valve 64 in view of pressure $P_y$ being equal to pressure $P_x$ at null. Referring to FIG. 3, it is apparent that a reduction in the equilibrium ratio of pressures $P_{3/P_x}$ reduces the engine speeds at which poppet valve 64 action occurs. Thus, by suitable selection of the ratio of areas of restrictions 120 and 116 and/or ratio of areas of fixed restriction 124 and venturi 126 the poppet valve 64 operation may be adjusted to meet the requirements of a given engine.

The air flows from outlet ports 88 and 90 of fluidic amplifier 82 are vented via choked venturi restriction 110 to atmospheric air pressure $P_A$. It will be recognized that by suitable selection of the effective flow areas of fixed restriction 86 and venturi 110, the supply air pressure $P_S$ intermediate restrictions 100 and 86 and the vent pressure $P_V$ intermediate outlet port 88 and venturi restriction 110 may be controlled in an optimum ratio with compressor discharge air pressure $P_3$ to provide best performance of the amplifier 82 as well as assure that the pressure $P_2$ supplied to diaphragm 72 is well within the saturation limits of amplifier 82. If the vent pressure $P_V$ was equivalent to pressure $P_1$, the substantial ratio increase of $P_{2/P_1}$ relative to the ratio increase of $P_{3/P_1}$, as the poppet valve 64 moves in a closing direction, would require a large increase in the amplifier 82 null output pressure recovery $P_x - P_V/P_S - P_V$ thereby taxing the capabilities of conventional fluidic amplifiers. However, by making vent pressure $P_V$ a fixed fraction of pressure $P_3$, the vent pressure $P_V$ may be made to equal pressure $P_1$ for the open condition of poppet valve 64 and significantly larger for the closed condition of poppet valve 64 thus not requiring as great a pressure recovery fraction for pressure $P_2$ at equilibrium of poppet valve 64.

I claim:

1. Gas turbine engine air compressor bleed valve apparatus comprising:

valve means operatively connected to said air compressor for venting compressor pressurized air from a compressor stage intermediate the compressor inlet and outlet to a relatively lower pressure air source;

first pressure responsive means responsive to the pressure differential between said compressor pressurized air and said relatively lower pressure air operatively connected to said valve means for actuating the same in an opening direction;

second pressure responsive means responsive to the pressure differential between a control air pressure and said relatively lower air pressure operatively connected to said valve means for actuating the same in a closing direction;

a first passage having first and second series flow restrictions communicating compressor discharge air with a relatively lower pressure air source;

a second passage having third and fourth series flow restrictions communicating compressor pressurized air from said intermediate stage to compressor inlet air;

fluid pressure differential responsive control means responsive to the pressure differential between a first fluid pressure generated between said first and second flow restrictions which varies as a predetermined function of compressor pressure ratio and thus compressor corrected rotational speed and a second fluid pressure generated between said third and fourth flow restrictions said control means adapted to control said control air pressure in proportion to said fluid pressure differential derived from said first and second fluid pressures;

said valve means being actuated to a fully open position in response to said control air pressure at compressor corrected rotational speeds below a predetermined valve and progressively actuated to a fully closed position over a predetermined range of compressor corrected rotational speeds during an engine acceleration.

2. Gas turbine engine air compressor air bleed valve apparatus as claimed in claim 1 wherein:
said fluid pressure differential responsive control means includes a source of compressor pressurized air;
a pair of outlet ports one of which is vented to said second pressure responsive means and the other of which is vented to a relatively low pressure drain air source;
a deflectable air jet derived from said last named compressor pressurized air and directed toward said outlet ports to pressure the same to a variable degree depending upon the deflection thereof; and a pair of opposed control air ports one of which is connected to said first passage intermediate said first and second restrictions and the other of which is connected to said second passage intermediate said third and fourth restrictions;
said deflectable air jet being responsive to the air pressure differential between said pair of control air ports and having a null position in response to a zero pressure differential therebetween.

3. Gas turbine engine air compressor air bleed valve apparatus as claimed in claim 2 wherein:
said other outlet port is connected to said relatively low pressure drain air source via a third passage containing a fifth restriction;
said outlet port vented to said second pressure responsive means is further vented via a restriction to said third passage upstream from said fifth restriction.

4. Gas turbine engine air compressor air bleed valve apparatus as claimed in claim 1 wherein:
said second restriction is a venturi.

5. Gas turbine engine air compressor air bleed valve apparatus as claimed in claim 1 wherein:
said second and fourth restrictions are venturis.

6. Gas turbine engine air compressor bleed valve apparatus as claimed in claim 1 wherein:
said relatively lower pressure air source is compressor inlet air.

7. Gas turbine engine air compressor air bleed apparatus as claimed in claim 1 wherein:
said valve means is a poppet valve;
said first pressure responsive means is defined by the head portion of said poppet valve.

8. Gas turbine engine air compressor air bleed apparatus as claimed in claim 7 wherein:
said second pressure responsive means is a diaphragm fixedly secured to said poppet valve.

9. Gas turbine engine air compressor air bleed apparatus as claimed in claim 1 wherein:
said first and second restrictions have a predetermined fixed area ratio.

10. Gas turbine engine air compressor air bleed apparatus as claimed in claim 1 wherein:
said first and second restrictions have a predetermined fixed area ratio; and
said third and fourth restrictions have a predetermined fixed area ratio.

* * * * *